United States Patent [19]

Trout

[11] Patent Number: 5,282,132

[45] Date of Patent: Jan. 25, 1994

[54] METHOD OF GEOPHYSICAL EXPLORATION USING SATELLITE AND SURFACE ACQUIRED GRAVITY DATA

[75] Inventor: Matt F. Trout, Brookshire, Tex.

[73] Assignee: Amoco Corporation, Chicago, Ill.

[21] Appl. No.: 785,574

[22] Filed: Oct. 30, 1991

[51] Int. Cl.[5] .............................................. G01V 1/00
[52] U.S. Cl. ...................................... 364/420; 73/152; 73/382 R
[58] Field of Search ............. 364/420, 422; 73/382 R, 73/382 G, 152; 324/323

[56] References Cited

U.S. PATENT DOCUMENTS

4,550,601 11/1985 Evans ................................. 73/382 R
5,012,675 5/1991 Koller et al. ....................... 73/432.1

Primary Examiner—Roy N. Envall, Jr.
Assistant Examiner—Khai Tran
Attorney, Agent, or Firm—James A. Gabala; Richard A. Kretchmer

[57] ABSTRACT

A method of geophysical exploration is provided whereby satellite derived and surface acquired gravity data sets can be employed to produce a merged gravity data set. In particular, surface acquired gravity data can be filtered so as to have a frequency content matching the satellite acquired gravity data. Employing mistie analysis, both gravity data sets can be combined to produce a merged gravity data set. The resulting merged gravity data set provides means for referencing both non-overlapping surface acquired gravity data sets and satellite derived gravity data sets to a common or reference datum such that they can be compared directly.

12 Claims, 7 Drawing Sheets

METHOD OF GEOPHYSICAL EXPLORATION USING SATELLITE AND SURFACE ACQUIRED GRAVITY DATA

BACKGROUND OF THE INVENTION

The present invention relates generally to a method of geophysical exploration and, more particularly, to an improved method of gravimetric exploration employing satellite derived gravity data and surface acquired gravity data.

Most gravimetric surveys carried out in the search for oil and gas as well as for mineral and tectonic studies are designed for reconnaissance of large, previously unexplored areas. Where little or no geological information is available for a region, the first question to be answered by a gravimetric survey is whether or not sufficient sedimentary materials exist to conduct more detailed and costly investigations. Since variations in gravity depend upon changes in the density of earth formations in the vicinity of a measuring site, gravimetric surveys can be employed to determine the extent of sedimentary materials. Additionally, gravimetric surveys can be employed to locate faults, anticlinal structures and salt domes.

More recently, a variety of techniques have been developed for deriving gravity data from satellite altimeter data as described by R. C. A. Zandbergen in "Satellite Altimeter Data Processing: From Theory To Practice," Delft University, 1990. Consequently, worldwide satellite derived gravity data sets are now available at extremely attractive prices. However, such satellite derived gravity data are comprised principally of low frequency information which is too sparse (i.e., typical satellite tracks can be separated one from another by several kilometers) to provide sufficient detail to an explorationist in locating and mapping either sedimentary basins or structural faulting. While satellite derived gravity data sets hold out the possibility of extremely low cost and broad marine coverage, they have largely been of little value to explorationists who depend upon the greater resolution and more selective siting of surface acquired gravity data sets.

The present invention provides explorationists with a novel method of gravimetric exploration which overcomes the historical obstacles to utilizing satellite derived gravity data and thus taking advantage of both its low cost and broad coverage. Moreover, the present invention provides a novel method for referencing separate, non-overlapping surface acquired gravity data sets to a common reference or datum so as to extrapolate interpretive results and conclusions from one area to another.

SUMMARY OF THE INVENTION

An improved method of gravimetric exploration is described whereby surface acquired gravity data and satellite derived gravity data can be combined into a merged gravity data set. In particular, the surface acquired gravity data are filtered so as to have a frequency content substantially similar to that of the satellite derived gravity data. The filtered surface acquired gravity data and the satellite derived gravity data can then be referenced to a common datum so as to produce a low frequency merged gravity data set. Additionally, the surface acquired gravity data can be filtered so as to have a frequency content substantially complementary to that of the satellite derived gravity data. By referencing the complementary filtered surface acquired gravity data to a common datum with the low frequency merged gravity data set, a revised surface required gravity data set can be obtained which has been referenced to a worldwide, consistent datum having substantially similar frequency content to that of the original surface acquired gravity data. As such, non-overlapping surface acquired gravity data sets processed according to the present invention can be directly compared one to the other. The resulting merged gravity data sets utilize all available control to yield the optimum data set. These and other benefits will be more clearly understood with the aid of the accompanying drawings and the detailed description of the invention.

DETAILED DESCRIPTION OF THE INVENTION

Figure 1:
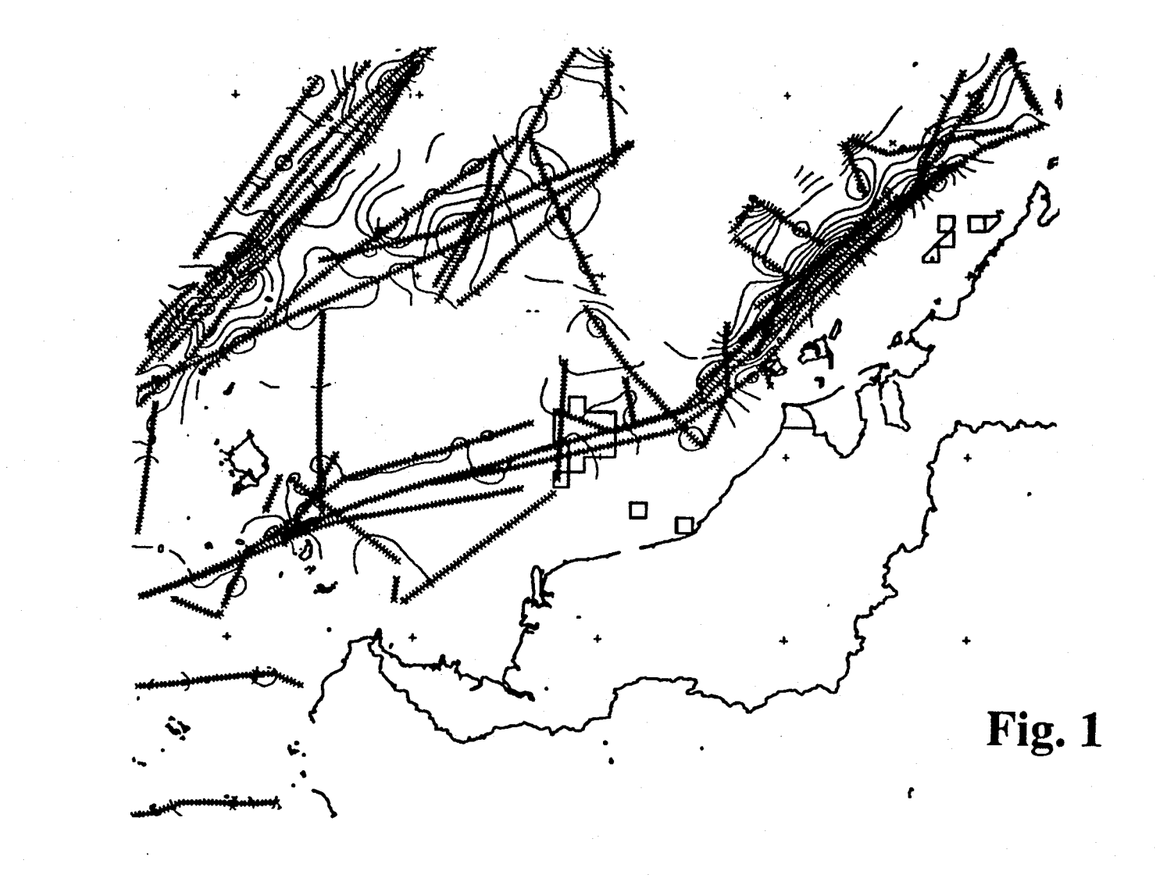
FIG. 1 comprises a set of surface acquired gravity data displayed as contour lines as well as the track lines of the ship acquiring the data set.

In order to better understand the present invention, the following introductory discussion is provided. Gravimetric surveys, unlike other methods of geophysical exploration, involve measuring a field force that is neither generated by the observer nor influenced by anything the observer does. In fact, the quantity actually measured is generally not the true gravitational attraction at a particular location; but rather, its variation from one point to another. Surface acquired gravity data typically includes obtaining measures of the gravitational force at or near the surface of the earth at selected sites along a line of profile. Surface gravity survey methods include land, marine, and airborne acquisition techniques. In order for surface acquired gravity data to be most useful, the field collected gravity data must first be corrected for elevation, latitude, and the influence of near-by topography. After correction, the surface acquired gravity data are generally presented as contour maps as depicted in FIG. 1. FIG. 1 also includes cross-hatched lines indicating the lines of profile along which the surface gravity data have been collected.

Surface gravity data are typically acquired along a plurality of intersecting lines of profile. As a consequence, it is often times necessary to resolve differences in gravity obtained at the points of intersection of the various lines of profile such that the gravity data are referenced to a common datum. Such analysis scheme is generally referred to as "mistie analysis," whereby the differences in gravity at all the points of intersection of the various lines of profile are minimized. Fundamentally, the mistie analysis involves adjusting the datum of the various lines of profile until the sum of the differences in gravity at the intersection points of crossing lines of profile is minimized. A variety of statistical fitting techniques, including least squares, can be used.

Unfortunately, surface acquired gravity data sets which are non-overlapping (i.e., do not include one or more intersecting lines of profile) are not amenable to such mistie analysis scheme and hence cannot be referenced to a common datum. A serious consequence of not referencing separate, non-overlapping surface acquired gravity data sets to a common datum is the inability to extrapolate the evaluation and interpretation of the earth's subsurface derived from one data set to the other. As a result, exploration costs can be increased because original work must be often times repeated.

Figure 2:
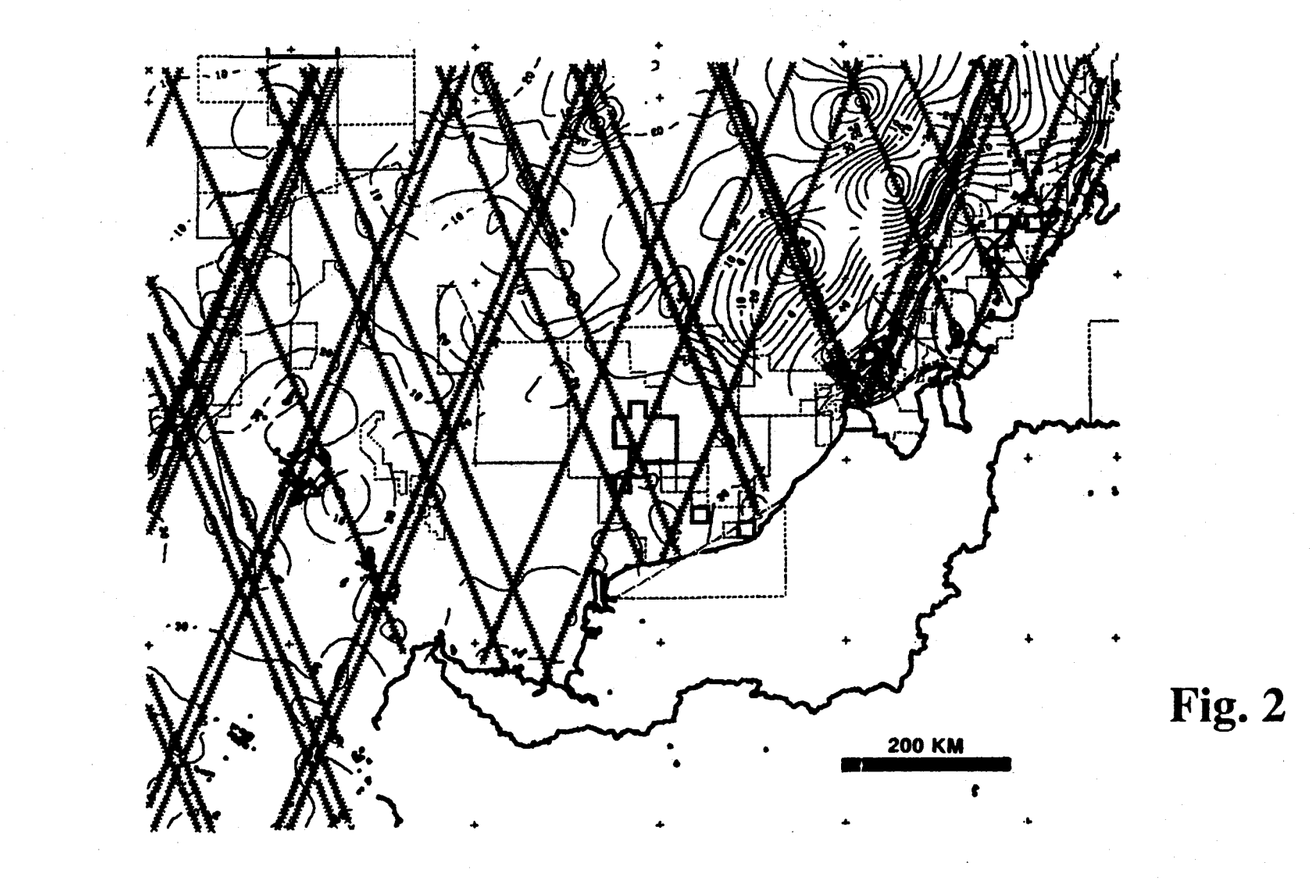
FIG. 2 comprises a set of satellite derived gravity data displayed as contour lines as well as track lines of the satellite acquiring the data.

With the advent of commercially available satellites, such as SEASAT and GEOSAT, novel techniques have been developed for deriving gravity data over water covered portions of the earth from a relatively coarse grid of satellite tracks. Of the various methods for deriving gravity data from satellite, the altimeter method, in which the sea surface elevation is measured at selected locations along the satellites projected track, is most commonly used. After correction for tides, currents, etc., such altimeter data can be transformed into contour maps of gravity. FIG. 2 comprises a contour map of free air gravity derived from satellite altimeter data. A particular shortcoming of such gravity data is the gap between satellite tracks which can form areas of no data up to 340 km by 140 km as indicated by the cross-hatched lines representing the satellite tracks in FIG. 2. These gaps in coverage often preclude accurate tying of satellite derived gravity data to known geologic features or areas of geological interest.

Because of the nature of the satellite acquisition method and the correction process, satellite derived gravity data tends to have a lower spatial frequency content than surface acquired gravity data. Nevertheless, for wave lengths greater than 45 km, satellite derived gravity data can be as accurate as surface acquired gravity data. However, the low frequency content and large spacing between satellite tracks have limited the utility of satellite derived gravity data for use by explorationists. In fact, the differences in frequency content have generally precluded integration or merger of the surface acquired and satellite derived gravity data sets into a merged gravity data set having a common or reference datum. As a consequence, explorationists have been unable to either augment satellite derived gravity data with surface acquired gravity data, so as to provide better resolution in an area of interest to explorationists, or to reference to a common datum two or more surface acquired gravity data sets separated one from the other, yet lying in proximity to a satellite track.

Figure 3:
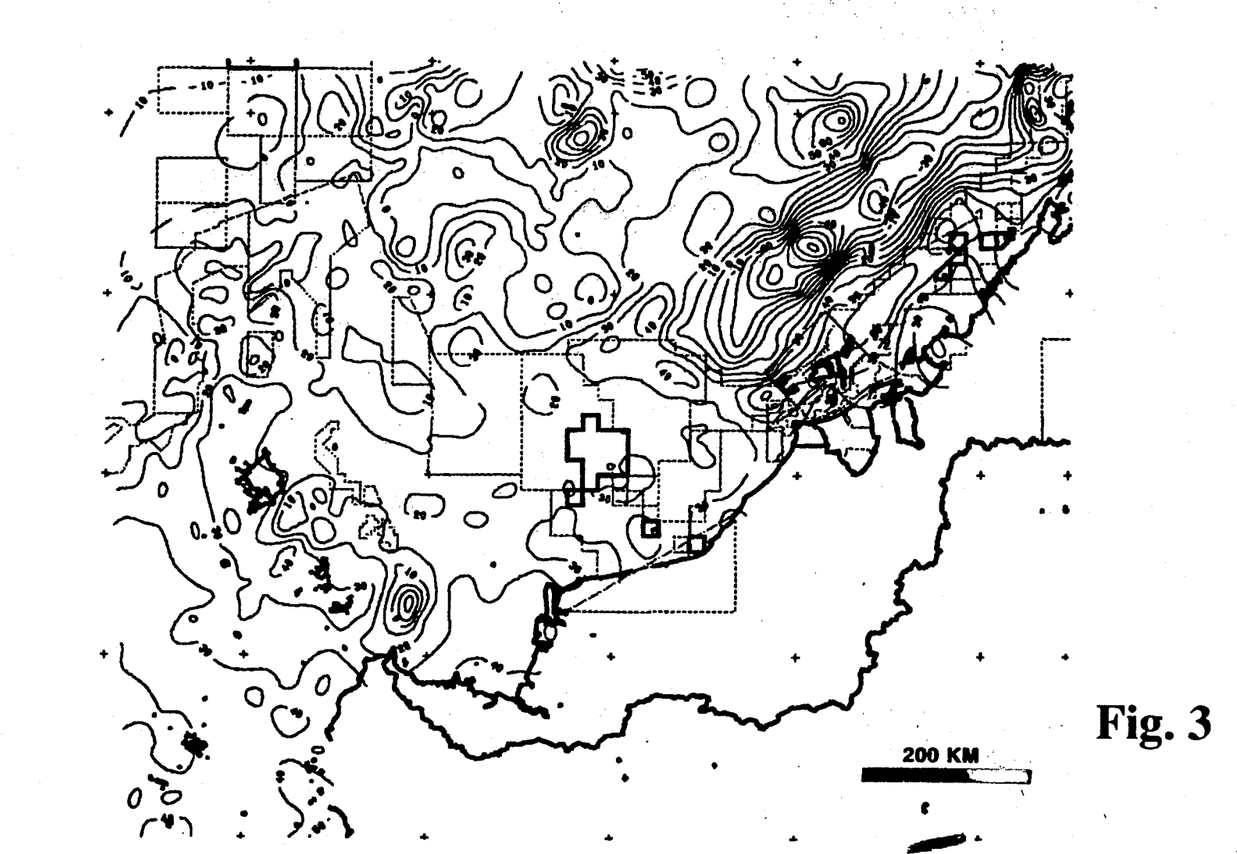
FIG. 3 comprises a merged low frequency gravity data set of the gravity data from FIGS. 1 and 2 in accordance with the present invention.

Looking now to FIG. 3, a merged set of the satellite derived and surface acquired gravity data sets from FIGS. 1 and 2 is depicted. Clearly, FIG. 3 provides not only greater information in the vicinity of the original satellite derived gravity data set, but has referenced the surface acquired gravity data to a worldwide, consistent datum. By adjusting the datum of two or more separate, non-overlapping surface acquired gravity data sets to a worldwide, consistent datum, explorationists can extrapolate conclusions and findings associated with a first surface acquired gravity data set to a second, but non-overlapping, surface acquired gravity data set.

The merged gravity data of FIG. 3 fills many of the data gaps between the satellite tracks of FIG. 2. The merged gravity data set of FIG. 3 has an RMS mistie error of ±3 milligals from the surface acquired and satellite derived gravity data sets. Of particular note, the merged gravity data of FIG. 3 provides means for applying additional tectonic constraints to the extents of transitional or attenuated continental crust as well as identifying additional strike-slip faulting not originally interpreted in either the satellite derived or surface acquired data sets. Particularly noteworthy of the merged gravity data set is the substantial reduction in cost to generate it over the costs of having to acquire similar data employing conventional surface gravity acquisition techniques.

Figure 4A:
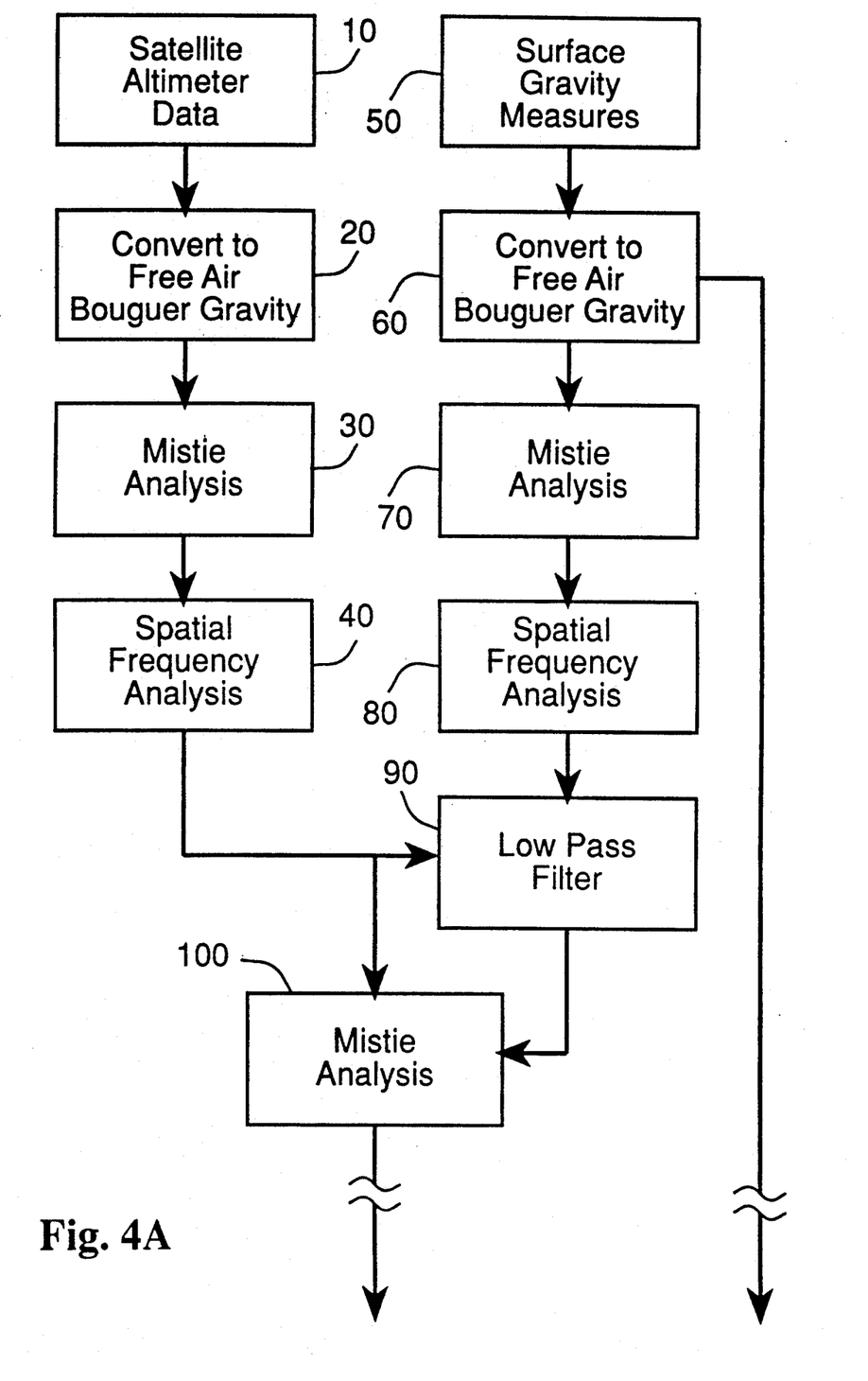
FIGS. 4a and b comprise a flow diagram for obtaining merged gravity data sets.
Figure 4B:
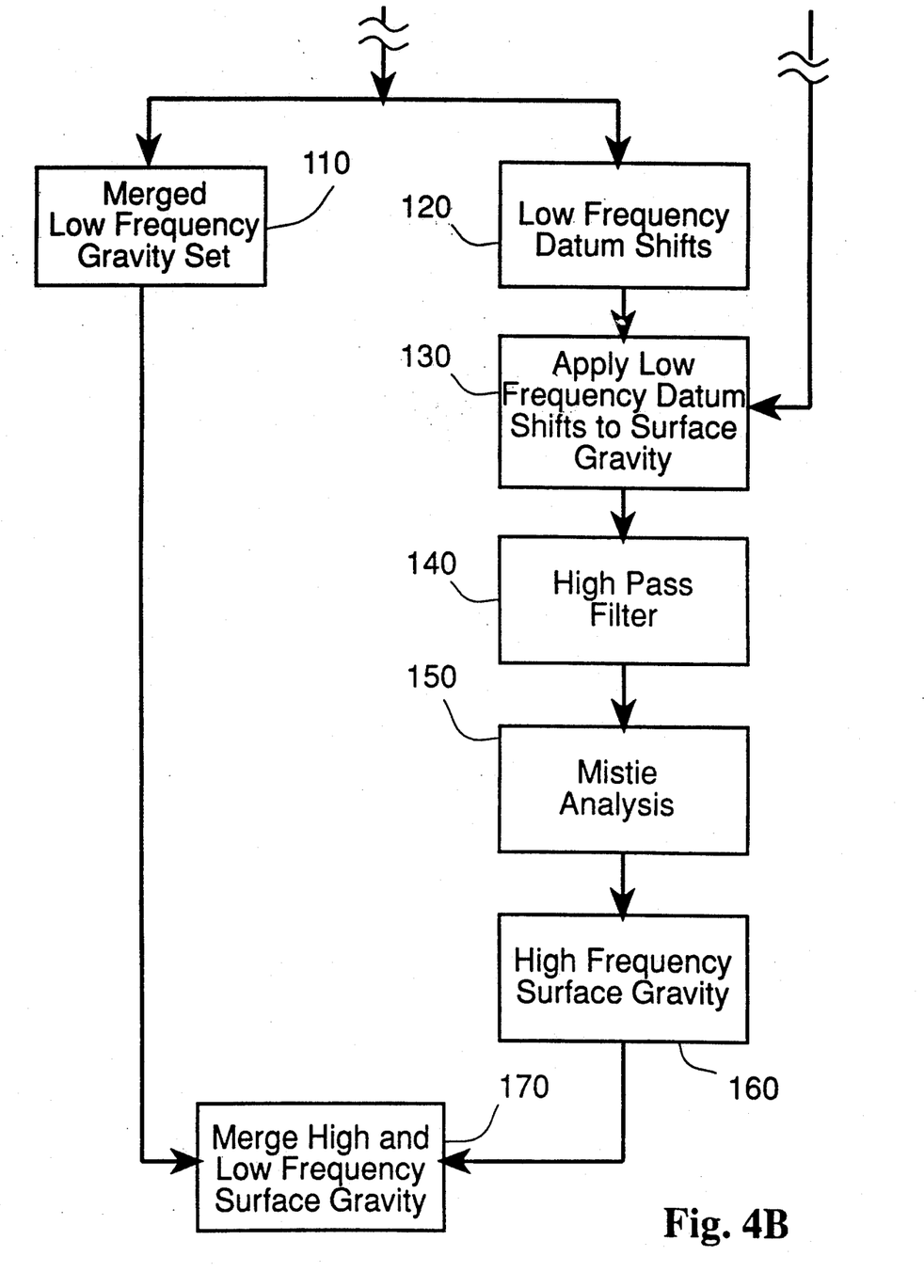

Looking now to FIGS. 4a and 4b, the present invention will be described in more detail. At step 10, satellite altimeter measurements of surface elevation of water bodies can be obtained from commercially available satellites, such as SEASAT and GEOSAT, and converted into a satellite derived gravity data set at step 20. Such acquisition and conversion process includes correction for tidal, cross over errors and reduction to free air and Bouguer gravity. All of which are well-known to those skilled in the art as described, by way of example, in NASA Technical Memorandum 100735, "Dynamic Sea Surface Topography, Gravity and Improved Orbit Accuracies From the Direct Evaluation of SEASAT Altimeter Data," J. G. Marsh et al, May 1989. Alternatively, commercially available contour maps of satellite derived gravity data, as depicted in FIG. 2, can be interpolated from their original gridded format onto projected satellite tracks or lines of profile.

At step 30, a mistie analysis is undertaken to resolve differences in the derived satellite gravity data at the intersection points of the different satellite tracks or lines of profile. The mistie analysis process is adapted to minimize the sum of such differences in gravity. Typically, the datum of the gravity data along various lines of profile are adjusted either upwardly or downwardly to obtain such results. Since the satellite derived gravity data are internally consistent and can have worldwide marine extent, they can be employed as a reference datum for the merger of individual, non-overlapping surface acquired gravity data sets as will be more completely discussed below.

Figure 5:
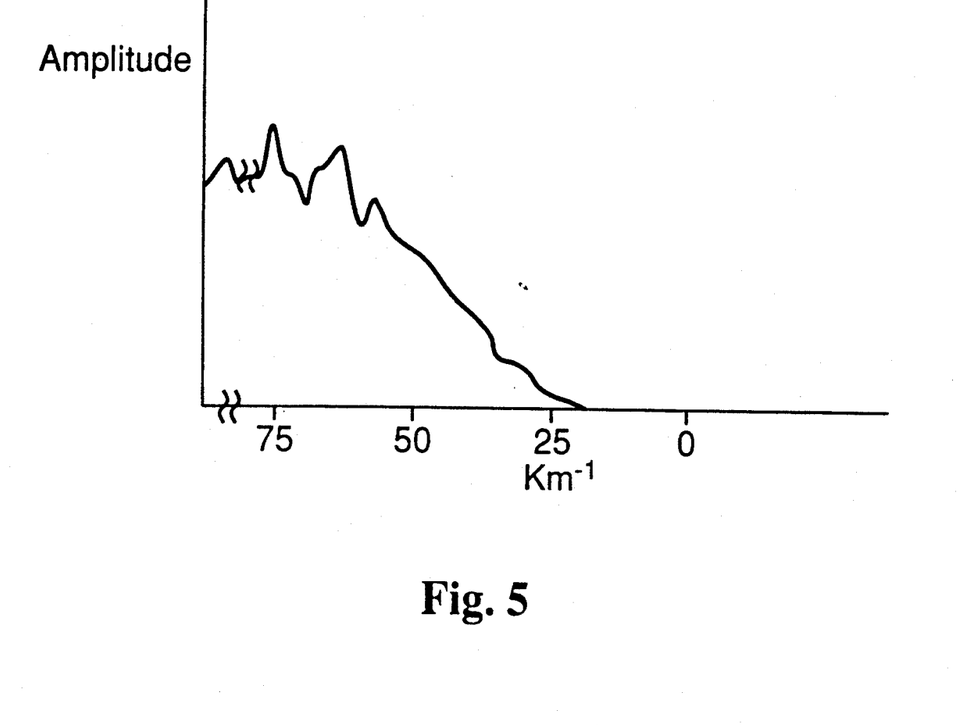
FIG. 5 comprises a satellite gravity data amplitude spectrum.

A spatial frequency content analysis of the satellite derived gravity data can be performed at step 40. By way of example, a Fourier transform of the satellite derived gravity data is performed to produce an amplitude spectrum as depicted in FIG. 5. While FIG. 5 represents a synthetic amplitude spectrum, it does highlight the lower frequency or longer wave length nature of satellite derived gravity data.

Figure 6:
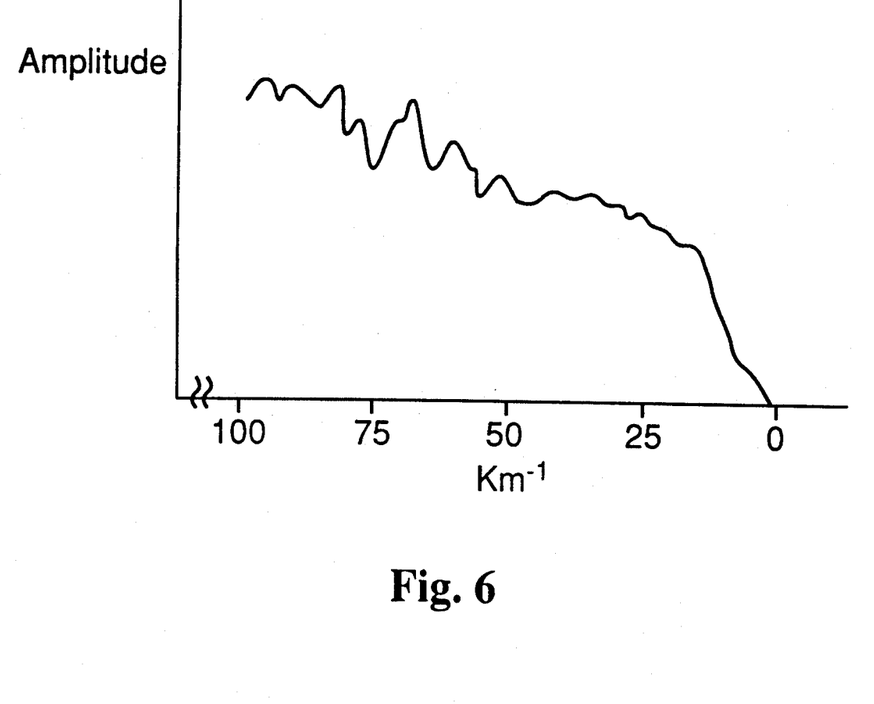
FIG. 6 comprises a surface acquired gravity data amplitude spectrum.

In a similar fashion, surface acquired gravity data sets can be collected at step 50 at step 60 and corrected to a measure of free air and Bouguer gravity at selected locations along the lines of profile in which the data were gathered. A mistie analysis of the corrected surface gravity data is performed at step 70. By use of a Fourier transform, the corrected surface gravity data can be converted into an amplitude spectrum as depicted in FIG. 6 to analyze its spatial frequency content at step 80. While FIG. 6 represents a synthetic amplitude spectrum, it does highlight the higher frequency or shorter wave length nature of surface acquired gravity data especially when compared to satellite derived gravity data as depicted in FIG. 5.

At step 90, a low pass band filter can be constructed using the frequency analysis of the satellite derived gravity data from step 40 and applied to the corrected surface gravity data so as to produce a low pass surface gravity data set having a frequency content substantially matching that of the satellite derived gravity data set. Typically, such low pass band filter will pass wave lengths greater than 25 km. A mistie analysis of the low pass surface gravity data and the satellite derived gravity data is performed at step 100 to yield a merged low frequency gravity data set at step 110. The merged gravity data depicted in FIG. 3, in fact, comprises a merged low frequency gravity data set. While such gravity data are referred to as merged, those skilled in the art will appreciate that it is also correct to identify its component parts (i.e., low pass surface and satellite derived gravity data sets) as each having been referenced to a common datum. As such, the gravity data sets available from step 110 can include a merged low frequency gravity data set, as well as one or more low frequency surface gravity data sets all of which have been referenced to common datum. The low frequency datum shifts used to optimize the mistie analysis at step 100 can be stored at step 120.

The low frequency datum shifts of step 120 can be applied to the corrected surface gravity data of step 60. Thereafter, a high pass band filter can be constructed at step 140 so as to have a frequency content complementary to the low pass band filter of step 90 (i.e., the combined frequency content of the high pass band and low pass band filters is coextensive with that of the unfiltered surface acquired gravity data). Alternatively, the high pass band filter of step 140 can be a reject band filter whereby the frequency content of the satellite derived gravity data from step 40 defines the reject band. In either case, the corrected surface gravity data is filtered to produce a high pass surface gravity data set at step 140.

At step 150, a residual mistie analysis of the high pass surface gravity data is performed to produce a high frequency surface gravity data set at step 160.

At step 170, the low frequency surface gravity data from step 110 can then be combined with the high frequency surface gravity data from step 160 set to yield a final merged surface gravity data set. The resulting final merged surface gravity data set has now been referenced to a worldwide, consistent reference datum defined by the satellite derived gravity data. As such, this final merged surface data set will tie to other surface surveys processed through this procedure even if the two surface gravity surveys are separate and non-overlapping.

Having described merging of one surface acquired gravity data set with a satellite derived gravity data set, those skilled in the art will understand that multiple, non-overlapping, surface acquired data sets can be similarly merged with the satellite derived gravity data set. A significant consequence of merging multiple, nonoverlapping surface acquired gravity data sets with the satellite derived gravity data set is the ability to adjust the datum levels of the various, non-overlapping surface acquired gravity data sets to a common or worldwide reference datum defined by the satellite derived gravity data. This referencing allows the explorationist to compare directly the results of separate, non-overlapping surface acquired gravity data sets as well as extrapolate the results from one surface acquired gravity data set to another. These and other benefits as well as improvements thereto will immediately be apparent to those skilled in the art and as such, the present invention is intended to be limited only by the scope of the claims presented herewith.

I claim:

1. A method of geophysical exploration employing a satellite derived gravity data set and a surface gravity data set, comprising the steps of:
   (a) filtering the surface acquired gravity data set so as to have a frequency content substantially similar to the satellite derived gravity data set; and
   (b) shifting datums of the filtered surface gravity data set and the satellite derived gravity data set so as to minimize differences in gravity at points of intersection in the two gravity data sets and producing a merged gravity data set.

2. The method of claim 1, wherein said merged gravity set comprises a low frequency merged gravity data set having spatial wave lengths greater than 25 km.

3. The method of claim 1, wherein said merged gravity data set comprises a satellite derived gravity data set and a surface acquired gravity data set, both referenced to a common datum.

4. The method of claim 1, wherein the step of filtering is performed by band reject filtering the surface acquired gravity data set so as to have substantially the same frequency content as the satellite derived gravity data set and producing a low frequency surface acquired gravity data set having spatial wave lengths greater than 25 km; and wherein the step of shifting is performed by referencing the satellite acquired gravity data set and the low frequency surface acquired gravity data set to a common datum and producing a merged low frequency gravity data set having spatial wave lengths greater than 25 km.

5. The method of claim 1, wherein the step of filtering is performed by band pass filtering the surface acquired gravity data set so as to have substantially the same frequency content as the satellite derived gravity data set and producing a low frequency surface acquired gravity data set; and wherein the step of shifting is performed by referencing the satellite acquired gravity data set and the low frequency surface acquired gravity data set to the common datum and producing a merged low frequency gravity data set.

6. An improved method of gravimetric exploration employing surface acquired gravity data and satellite derived gravity data, comprising the steps of:
   (a) filtering the surface acquired gravity data and obtaining first filtered surface acquired gravity data having a frequency content substantially similar to the frequency content of the satellite derived gravity data; and
   (b) combining said first filtered surface acquired gravity data with the satellite derived gravity data nd producing a first merged gravity data set.

7. The method of claim 6, wherein the stp of combining includes:
   (a) performing a mistie analysis of said first filtered surface acquired gravity data and the satellite derived gravity data and determining a first set of datum shifts; and
   (b) applying said first set of datum shifts to both said first filtered surface acquired gravity data and the satellite derived gravity data and producing the first merged gravity data set that is referenced to a common datum.

8. The method of claim 7, further including the step s of :

(c) filtering the surface acquired gravity data and obtaining second filtered surface acquired gravity data having a frequency content substantially complementary to the satellite derived gravity data; and (d) combining said second filtered surface acquired gravity data with said first merged gravity data set and producing a second merged gravity data set.

9. The method of claim 8, wherein step (d) is performed by applying said first set of datum shifts to said second filtered surface acquired gravity data and to the satellite derived data and producing a merged gravity data set that is referenced to a common datum.

10. An improved method of gravimetric exploration employing at least two separate, non-overlapping surface acquired gravity data sets and a satellite derived gravity data set, comprising the steps of:

(a) referencing a first and second separate, non-overlapping surface acquired gravity data sets to a common datum defined by the satellite derived gravity data set; and (b) extrapolating evaluations and interpretations of the earth's subsurface formations derived from the first set of surface acquired gravity data to the second set of surface acquired gravity data.

11. The method of claim 10, wherein the step of referencing comprises: p1 (aa) filtering the first and second separate, non-overlapping surface acquired gravity data sets to have a frequency content substantially similar to the frequency content of the satellite derived gravity data set; and (ab) performing a mistie analysis of the filtered first and second separate, non-overlapping surface acquired gravity data sets so as to reference each of said gravity data sets to a common datum.

12. The method of claim 11, further including the steps of:

(ac) filtering the first and second separate, non-overlapping surface acquired gravity data sets so as to have a frequency content substantially complementary to the satellite derived gravity data set; and (ad) combining the filtered first and second separate, non-overlapping surface acquired gravity data sets having frequency contents substantially similar to and substantially complementary to the satellite derived gravity data set and obtaining final first and second surface acquired gravity data sets referenced to the common datum.

* * * * *